US009600810B2

(12) United States Patent
Smith et al.

(10) Patent No.: US 9,600,810 B2
(45) Date of Patent: Mar. 21, 2017

(54) LICENSE MANAGEMENT FOR DEVICE MANAGEMENT SYSTEM

(71) Applicant: BlackBerry Limited, Waterloo (CA)

(72) Inventors: Andrew Christopher Smith, Oakville (CA); Micheal Tyler, Fredericton (CA)

(73) Assignee: BlackBerry Limited, Waterloo, Ontario (CA)

(*) Notice: Subject to any disclaimer, the term of this patent is extended or adjusted under 35 U.S.C. 154(b) by 46 days.

(21) Appl. No.: 14/632,993

(22) Filed: Feb. 26, 2015

(65) Prior Publication Data

US 2016/0253641 A1    Sep. 1, 2016

(51) Int. Cl.
*H04L 29/06* (2006.01)
*G06Q 20/12* (2012.01)
*G06F 21/10* (2013.01)

(52) U.S. Cl.
CPC ....... *G06Q 20/1235* (2013.01); *G06F 21/105* (2013.01); *H04L 63/08* (2013.01)

(58) Field of Classification Search
CPC .... G06Q 20/1235; H04L 63/08; G06F 21/105
USPC ...................................... 726/6, 7, 26, 27, 31
See application file for complete search history.

(56) References Cited

U.S. PATENT DOCUMENTS

| | | | |
|---|---|---|---|
| 4,937,863 A * | 6/1990 | Robert ................. | G06F 21/105 705/59 |
| 6,574,612 B1 | 6/2003 | Baratti | |
| 7,370,017 B1 * | 5/2008 | Lindeman ............... | G06F 21/10 705/50 |
| 2007/0198427 A1 | 8/2007 | Vajjiravel et al. | |
| 2007/0198428 A1 | 8/2007 | Satkunanathan | |
| 2008/0005032 A1 | 1/2008 | Znidarsic | |
| 2008/0015888 A1 * | 1/2008 | Dang ...................... | G06F 21/10 705/1.1 |
| 2008/0209569 A1 * | 8/2008 | Araki ...................... | G06F 21/44 726/26 |
| 2008/0244754 A1 | 10/2008 | Curren | |
| 2009/0037287 A1 | 2/2009 | Baitalmal et al. | |
| 2009/0119779 A1 | 5/2009 | Dean | |
| 2009/0298478 A1 * | 12/2009 | Tyhurst ................. | H04W 4/001 455/414.1 |
| 2010/0250389 A1 | 9/2010 | Augustin et al. | |

(Continued)

OTHER PUBLICATIONS

International Search Report and Written Opinion issued by International Searching Authority in International Application No. PCT/US2015/059229 dated Jan. 27, 2016.

(Continued)

*Primary Examiner* — Sarah Su
(74) *Attorney, Agent, or Firm* — Fish & Richardson P.C.

(57) ABSTRACT

The present disclosure involves systems, software, and computer-implemented methods for managing access of device management systems in license management operations associated with purchase accounts of a bulk licensing system. An example method includes identifying a request for a license management operation associated with a purchase account of a bulk licensing system, wherein the request includes a licensing identity associated with the purchase account; in response to the identifying, determining that the license management operation is to be performed based on the licensing identity; and in response to the determining, performing the license management operation.

18 Claims, 5 Drawing Sheets

(56) References Cited

U.S. PATENT DOCUMENTS

| | | | |
|---|---|---|---|
| 2011/0106875 A1 | 5/2011 | Koenig | |
| 2011/0252415 A1 | 10/2011 | Ricci | |
| 2012/0011069 A1* | 1/2012 | Kazawa | G06F 21/10 705/59 |
| 2012/0210442 A1 | 8/2012 | Ito | |
| 2013/0091582 A1* | 4/2013 | Chen | G06Q 10/10 726/26 |
| 2013/0144633 A1 | 6/2013 | Guadarrama et al. | |
| 2013/0198864 A1 | 8/2013 | Li et al. | |
| 2013/0247209 A1 | 9/2013 | Didcock et al. | |
| 2014/0337924 A1* | 11/2014 | Smith | H04L 63/10 726/4 |
| 2015/0120784 A1 | 4/2015 | Satoh | |
| 2015/0235039 A1* | 8/2015 | Yoshinari | G06Q 20/10 705/39 |
| 2015/0281332 A1 | 10/2015 | Naito et al. | |
| 2016/0125174 A1* | 5/2016 | Matsushima | G06Q 10/10 726/30 |
| 2016/0142511 A1* | 5/2016 | Smith | H04L 67/02 709/223 |

OTHER PUBLICATIONS

International Search Report and Written Opinion issued by International Searching Authority in International Application No. PCT/CA2016/050204 dated Jun. 1, 2016.

Extended European Search Report issued in European Application No. 16157484.3 on Jun. 22, 2016.

\* cited by examiner

LICENSE MANAGEMENT FOR DEVICE MANAGEMENT SYSTEM

BACKGROUND

The present disclosure involves systems, software, and computer-implemented methods for managing access of device management systems in license management operations associated with purchase accounts of a bulk licensing system.

Application stores allow users to download software applications to devices electronically over a network. In some cases, the application stores may manage licenses associated with the applications and present End-User License Agreements (EULAs) to the user electronically for acceptance. Users may register an account with a particular application store, allowing them to purchase and download software applications from the particular application store.

SUMMARY

The present disclosure involves systems, software, and computer-implemented methods for managing access of device management systems in license management operations associated with purchase accounts of a bulk licensing system. One example method includes identifying a request for a license management operation associated with a purchase account of a bulk licensing system, wherein the request includes a licensing identity associated with the purchase account; in response to the identifying, determining that the license management operation is to be performed based on the licensing identity; and in response to the determining, performing the license management operation.

Another example method includes identifying, at a device management system, a request to manage one or more licenses associated with a purchase account of a bulk licensing system; wherein the request to manage one or more licenses is associated with a tenant identity and the bulk licensing system is separated from the device management system; determining, by the device management system, a licensing identity for the tenant identity, wherein the licensing identity is associated with the purchase account; and sending, from the device management system to the bulk licensing system, a request to perform a license management operation, wherein the request to perform a license management operation includes the licensing identity and the license management operation is based on the request to manage one or more licenses.

While generally described as computer-implemented software embodied on non-transitory, tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features, objects, and advantages of the disclosure will be apparent from the description and drawings, and from the claims.

DETAILED DESCRIPTION

In corporate and other networks, device management systems (e.g., mobile device management (MDM) systems) may be used to manage assignments of software applications to users and devices. For example, an administrator may configure a device management system to assign a particular software application to a particular group of users, and specify that the users in the group are required to install the particular software application. The device management system may implement such an assignment, for example, by allocating a license for the particular software application to each user in the group. The device management system may also enforce the installation requirement, for example, by quarantining or isolating devices on the network associated with users from the group that have not installed the particular software application.

Software applications are frequently managed and hosted by application stores, which may enable users or administrators to purchase licenses for and download the software applications onto devices for installation. Some application stores offer bulk licensing functionality, where a single account (e.g., a purchase account) can purchase multiple licenses for an application and assign the licenses to users associated with the purchase account. Such a bulk licensing system may also enable an administrator of the purchase account to perform license management operations associated with such a purchase account, including registering the purchase account, purchasing and allocating licenses associated with the purchase account, and other operations.

In some cases, global tokens can be used to provide access controls for purchase account. For example, for each purchase account, a global token can be generated and exported to all the device management systems. To request a licensing management operation associated with a purchase account, the global token is included in the request. In these or other cases, the purchase account administer has limited control on the device management systems that have access to the purchase account. For example, an unauthorized user may obtain the token and use the token to consume the licenses. In addition, the purchase account administer may not be able to control how each device management system access the purchase account. For example, the purchase account administer may not be able to restrict the number of licenses for a given application for each device management system. Furthermore, if a security breach at one device management system occurred, global tokens have to be regenerated and populated to all device management systems. In addition, the process of generating, importing, and maintaining the global tokens may include multiple processes, and therefore introduces human errors.

The present disclosure describes techniques for managing access of device management systems in license management operations associated with purchase accounts of a bulk licensing system. One example method includes identifying a request for a license management operation associated with a purchase account of a bulk licensing system. The request includes a licensing identity that is associated with the purchase account. The bulk licensing system determines whether to perform the license management operation based on the licensing identity. For example, in some cases, a list of licensing identities can be preconfigured for the purchase account. In these or other cases, the bulk licensing system can determine to perform the requested operation if the preconfigured list of licensing identities includes the licensing identity in the request.

In some implementations, the licensing identity can be determined or created based on a tenant identity. In some cases, the tenant identity can be generated in an infrastructure registration procedure. In an infrastructure registration procedure, a device management system can receive a tenant identity. The device management system can use the tenant identity when interacting with other entities in the same network infrastructure and receive infrastructure services. The device management system can register with the bulk licensing system to receive a licensing identity based on the tenant identity. In some cases, the device management system can also receive authentication credentials associated with the licensing identity. A user may send a request to a device management system to manage one or more licenses. The device management system determines the licensing identity based on the tenant identity and sends a request to the bulk licensing system using the licensing identity. In some cases, authentication credentials can also be used to authenticate requests for license management operation. For example, when a device management system registers with the bulk licensing system to receive the licensing identity, both the device management system and the bulk licensing system can receive a shared key. The bulk licensing system, therefore, uses the shared key to authenticate requests for licensing management operations from the device management system. In some cases, the device management system can perform a manual registration with the bulk licensing system to generate a licensing identity.

Implementations according to the present disclosure may provide several advantages. By using licensing identities to obtain access for license management operations, the device management system can reduce the amount of security information that the system maintains. Therefore, the complexity of the device management system can be reduced. Further, using licensing identities can reduce the security risks associated with generating and distributing authentication tokens. For example, this approach enables the purchase account administrator to indicate the types and quantities of licenses to a given device management system, and therefore establishes granular access controls. If there is a breach of a given device management system's credentials, the device management system can regenerate the licensing identity without impacting other device management systems.

Moreover, the amount of signaling exchanges between the device management system and the bulk licensing system can be reduced because the licensing identities can have a longer lifetime than authentication tokens. In addition, by using the tenant identities and the associated tenant authentication credentials generated during the existing registration operations, the access management operations can be simplified.

Furthermore, user experience can be improved. Instead of requiring users to manually exporting files for each purchase account, the device management system can automatically discover the purchase accounts that are associated with the licensing identity. Therefore, a user can request the licensing operation with "one click" instead of entering multiple manual inputs. Furthermore, the simplified operation can reduce human errors introduced in the global token management process.

Figure 1:
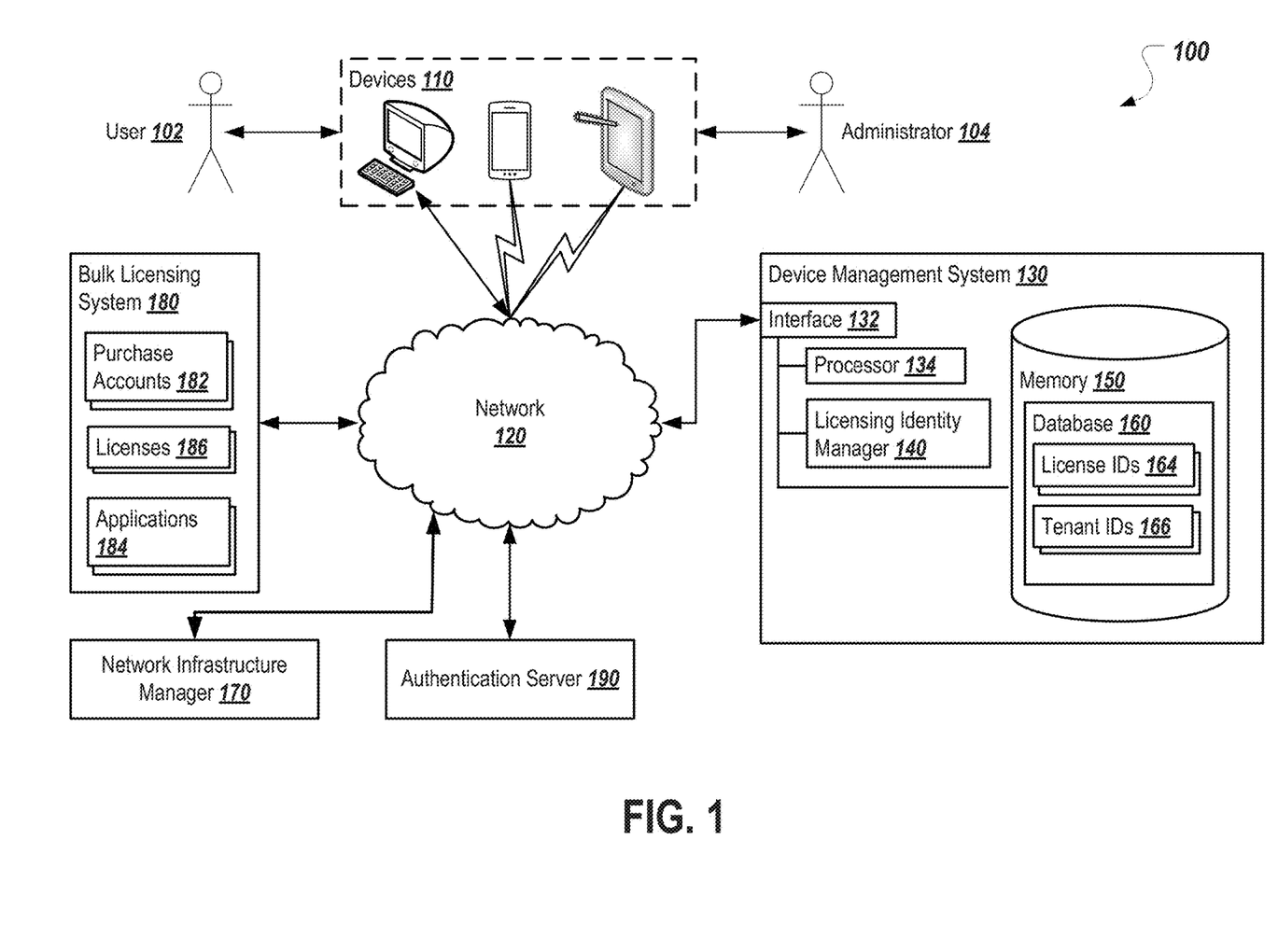
FIG. 1 is a block diagram illustrating an example environment for managing access of device management systems in license management operations associated with purchase accounts of a bulk licensing system.

FIG. 1 is a block diagram illustrating an example environment 100 for managing access of device management systems in license management operations associated with purchase accounts of a bulk licensing system. The environment 100 includes a device management system 130 connected to a bulk licensing system 180, an authentication server 190, a network infrastructure manager 170, and one or more devices 110 by a network 120. The one or more devices 110 are further coupled with a user 102 and an administrator 104.

In operation, the bulk licensing system 180 is configured to receive a request from the device management system 130 for a license management operation associated with a purchase account of the bulk licensing system 180. The request includes a licensing identity. In some implementations, the device management system 130 is configured to register with the bulk licensing system 180 and receive the licensing identity. In some implementations, the bulk licensing system 180 consults with the authentication server 190 in the licensing identity registration procedure. In some implementations, the licensing identity is generated based on a tenant identity In some implementations, the device management system 130 and the bulk licensing system 180 receive authentication credentials during the licensing identity registration process.

In response to the request for the license management operation, the bulk licensing system 180 is configured to determine whether the license management operation is to be performed based on the licensing identity. In some implementations, the purchase account is configured to associate with one or more licensing identities by the administrator 104 using the one or more devices 110. If the licensing identity in the request is included in the one or more licensing identities configured by the administrator 104 to allow the requested license management operation for the purchase account, the bulk licensing system 180 can determine that the request should be granted and perform the requested operation. Alternatively, if the licensing identity in the request is not included in the one or more licensing identities configured by the administrator 104 to allow the requested license management operation for the purchase account, the bulk licensing system 180 can determine that the request should be denied and refrain from performing the operation.

Figure 2:
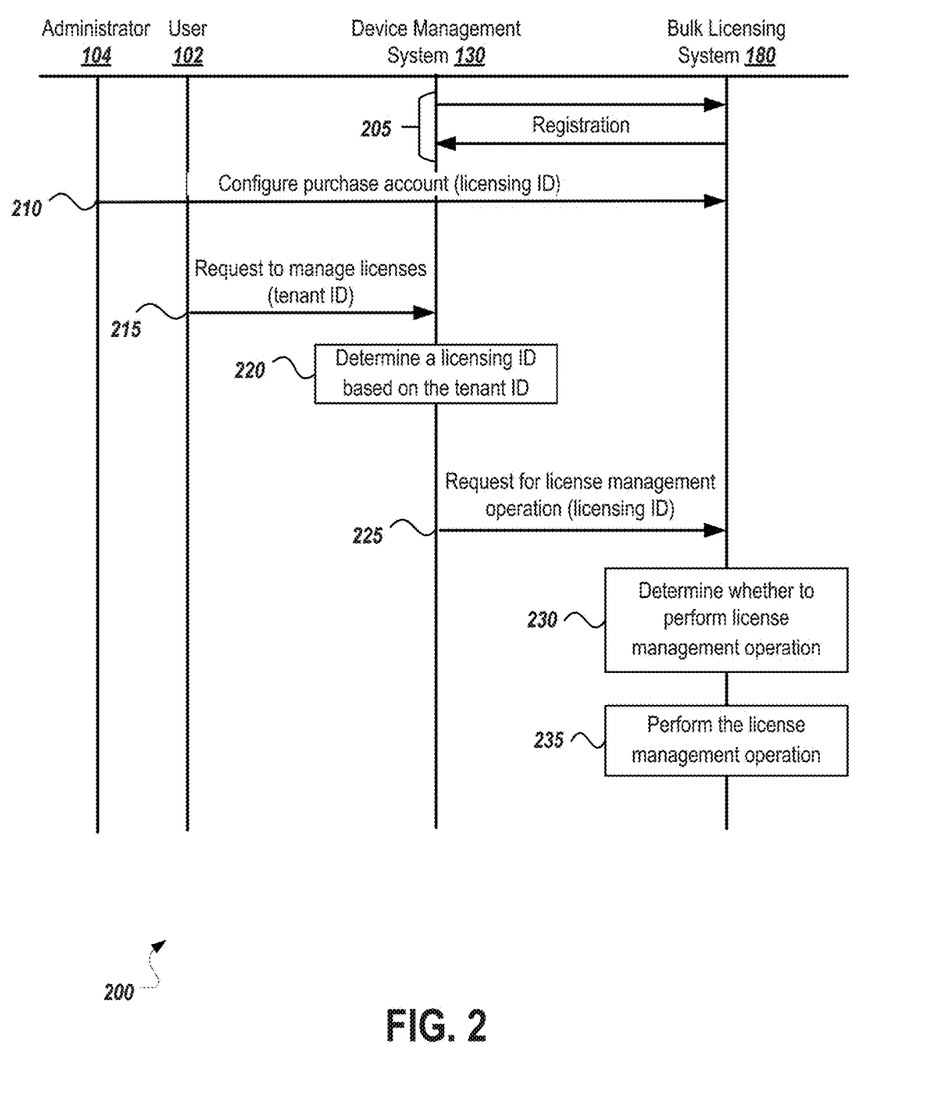
FIG. 2 is a message flow diagram illustrating an example process for managing access for license management operations.
Figure 3:
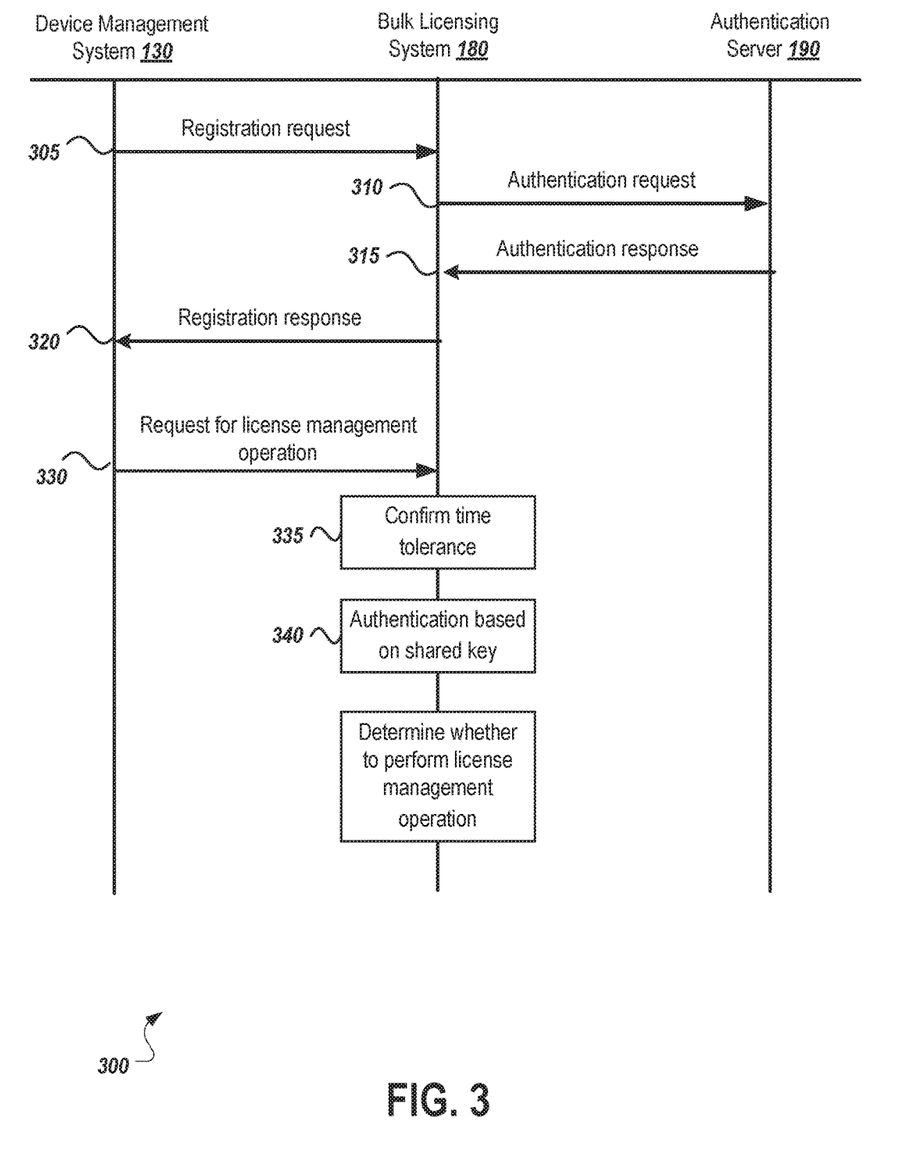
FIG. 3 is a flow chart illustrating an example process of licensing identity registration procedures in license management operations.

In some implementations, the device management system 130 is configured to receive a request to manage one or more licenses associated with a purchase account of the bulk licensing system 180 from the one or more devices 110. The request can be sent by the user 102 using the one or more devices 110. In some implementations, the request to manage one or more licenses can be associated with the tenant identity of the device management system 130. The device management system 130 determines the licensing identity for the tenant identity and sends a request to perform a license management operation to the bulk licensing system 180. The request to perform a license management operation includes the licensing identity, and the license management operation is based on the request to manage one or more licenses. In some implementations, the bulk licensing system 180 authenticates the request using the authentication credentials generated during the licensing identity registration procedure. FIGS. 2-3 provide additional details of these operations.

The environment 100 includes the network 120. In some implementations, the network 120 may be a wireless network provided by a corporation, educational institution, municipality, business, or other entity. Such a wireless network may utilize any standard wireless networking technology, including 802.11a, 802.11b, 802.11g, 802.11n, LTE, WiMax, CDMA, or any other suitable wireless networking technology. In such implementations, the wireless network may be a public network in the sense that any device within range may connect to the network. Even though any device within range may connect to the network 120 in such configurations, the device still may be required to authenticate in order to access resources on the network 120 and/or on the Internet. In some implementations, the entity that controls the network 120 may issue devices to users for use on the network 120. The network 120 may also be a wired network, such as an Ethernet network.

Device management system 130 is connected to the network 120. In some cases, the device management system 130 may be a computing device or set of computing devices operable to manage configuration attributes, enforce policies, and perform other operations related to the devices 110 connected to the network 120. In some implementations, the device management system 130 may be a mobile device management (MDM) system for managing wireless devices such as, for example, phones, tablets, laptops, or other devices.

In the present disclosure, the term "computing device" is intended to encompass any suitable processing device. For example, although FIG. 1 illustrates a device management system 130, the environment 100 can be implemented using two or more servers, as well as computers other than servers, including a server pool. Indeed, device management system 130 may be any computer or processing device such as, for example, a blade server, general-purpose personal computer (PC), a UNIX-based workstation, or any other suitable device. In other words, the present disclosure contemplates computing devices other than general-purpose computers, as well as computing devices without conventional operating systems. Further, the device management system 130 may be adapted to execute any operating system, including LINUX, UNIX, Berkeley Software Distribution (BSD), or other operating systems.

The device management system 130 also includes an interface 132, a processor 134, and a memory 150. The interface 132 is used by the device management system 130 for communicating with other systems connected to the network 120; for example, the bulk licensing system 180, the devices 110, as well as other systems communicably coupled to the network 120. Generally, the interface 132 comprises logic encoded in software and/or hardware in a suitable combination and operable to communicate with the network 120. More specifically, the interface 132 may comprise software supporting one or more communication protocols associated with communications such that the network 120 or the interface's hardware is operable to communicate physical signals within and outside of the illustrated environment 100.

As illustrated in FIG. 1, the device management system 130 includes a processor 134. Although illustrated as a single processor 134 in FIG. 1, two or more processors may be used according to particular needs, desires, or particular implementations of environment 100. Each processor 134 may be a central processing unit (CPU), a blade, an application-specific integrated circuit (ASIC), a field-programmable gate array (FPGA), or another suitable component. Generally, the processor 134 executes instructions and manipulates data to perform the operations of the device management system 130.

The device management system 130 also includes a licensing identity manager 140. The licensing identity manager 140 may be a software application executed by the device management system 130 operable to manage licensing identities, receive licensing identity in a licensing identity registration procedure and associate a licensing identity with the tenant identity, process requests from the user 102 to manage licenses, determine licensing identity that is associated with the tenant identity in the request, generate request for licensing management operations, include the licensing identity in the request for licensing management operations, and send the request for licensing management operations to the bulk licensing system 180.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in one or more programming languages including, but not limited to, C, C++, PERL, PYTHON, assembly language, or other programming languages. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components may be combined into single components as appropriate.

The device management system 130 also includes a memory 150 or multiple memories 150. The memory 150 may include any type of memory or database module and may take the form of volatile and/or non-volatile memory including, without limitation, magnetic media, optical media, random access memory (RAM), read-only memory (ROM), removable media, or any other suitable local or remote memory component.

Memory 150 includes a database 160. The database 160 may include a data set managed by a database management system, such as, for example, MYSQL, INGRES, POSTGRESQL, or other database management systems. In some cases, the database 160 may be a distributed database including multiple computing devices storing portions of the data set and communicating over a network. Database 160 may be operable to process queries specified in any structured or other query language such as, for example, Structured Query Language (SQL).

Database 160 includes tenant identity 166. In some cases, the tenant identity 166 can be generated and received during the registration process. The tenant identity 166 may be used to identify the device management system 130 in communicating with other entities associated with the network 120. For example, the tenant identity can be a Server Routing Protocol (SRP) Identifier (ID). In some cases, the device management system 130 can have more than one tenant identity 166. For example, the device management system 130 can register with more than one bulk licensing system 180 and receive a different tenant identity associated with each respective bulk licensing system 180. In some cases, the device management system 130 can manage multiple tenants and therefore can have multiple tenant identities. In these or other cases, the device management system 130 may perform a licensing identity registration procedure for each tenant and receive a licensing identity for each tenant.

Database 160 also includes licensing identity 164. The licensing identity 164 may be used to request licensing management operations. In some implementations, the licensing identity 164 is generated during the licensing identity registration process between the device management system 130 and the bulk licensing system 180. In some cases, the device management system 130 can have more than one licensing identity 164. For example, the device management system 130 can use a different licensing identity 164 to request licensing management operations with a different bulk licensing system 180. In some cases, the licensing identity 164 is associated with the tenant identity 166.

The environment 100 also includes a bulk licensing system 180. The bulk licensing system 180 may be a computing device or set of computing devices external to the device management system 130 offering applications 184 for purchase and download. The bulk licensing system 180 may also be implemented in the same platform as the device management system 130. The bulk licensing system 180 is configured to manage licenses 186 associated with purchase accounts 182 for applications 184. The bulk licensing system 180 may store the applications 184 and may allow the devices 110 to download requested applications in response to the successful purchase or under the purchase account 182.

The bulk licensing system 180 also includes licenses 186. The licenses 186 represent instances of a particular application to be associated with users and are purchased under and associated with the purchase accounts 182. The licenses may be associated with End-user license agreements (EULAs) to be executed between the user 102 requesting to download a particular application 184 and the developer or owner of the application 184, the bulk licensing system 180 itself, or both. In some cases, the bulk licensing system 180 may display the EULA to the user 102 when the user 102 requests to download the particular application 184. The bulk licensing system 180 may also require that the user 102 accept the license 186, such as by clicking the accept button indicating that the user has read the text of the license 186. In some cases, the conditions of registering an account with the bulk licensing system 180 may stipulate that requesting to download a particular application 184 constitutes acceptance of the associated license 186.

The bulk licensing system 180 manages sets of licenses 186 purchased under a purchase account 182. For example, a company may set up a purchase account 182 and purchase a block of 1000 licenses for a particular application 184. The company may then assign these licenses to users 102 that will use the particular application 184. In some implementations, the administrator 104 of the company can configure the purchase account 182 to associate with one or more licensing identities and allow access for requests for licensing management operations that include the configured licensing identity.

The environment 100 includes the authentication server 190 connected to the network 120. In some cases, the authentication server 190 may be a computing device or set of computing devices operable to perform authentication operations related to the device management system 130 and the bulk licensing system 180 connected to the network 120. In some implementations, the authentication server 190 can be an Authentication, authorization, and accounting (AAA).

The environment 100 also includes the network infrastructure manager 170 connected to the network 120. In some cases, the network infrastructure manager 170 may be a computing device or set of computing devices operable to manage network entities in a network infrastructure. In some cases, the network infrastructure includes the bulk licensing system 180, the authentication server 190, and the device management system 130. In these or other cases, the device management system 130 can perform an infrastructure registration procedure with the network infrastructure manager 170 to receive a tenant identity and associated tenant authentication credentials. The tenant identity and the authentication credentials can be used to authenticate the device management system 130 within the network infrastructure and request infrastructure services. In some cases, the network infrastructure manager 170 can be implemented in the same platform as the bulk licensing system 180, the authentication server 190, or a combination thereof.

FIG. 2 is a message flow diagram 200 illustrating an example process for managing access for license management operations. At 205, the device management system 130 registers with the bulk licensing system 180. In some cases, the device management system 130 can receive a licensing identity during the registration procedure. In some implementations, the device management system 130 performs a licensing identity registration procedure with the bulk licensing system 180 using a tenant identity. In the licensing identity registration procedure, the device management system 130 receives a licensing identity that is associated with the tenant identity. In some cases, the device management system 130 also receives an authentication credential that is associated with the licensing identity. In some cases, the authentication credentials are hidden from users of the device management system 130. FIG. 3 and associated descriptions provide additional details of the licensing identity registration procedure. In some cases, for example, when the device management system 130 is a third-party management system that operates in a different network infrastructure than the bulk licensing system 180, the device management system 130 may receive a licensing identity using a manual registration process via an online portal.

In some cases, the device management system 130 can receive a tenant identity during an infrastructure registration procedures. The tenant identity identifies the device management system 130 when communicating with other entities in the network infrastructure. For example, a device management system can receive an SRP ID as the tenant identity. In some cases, the device management system 130 can also receive tenant authentication credentials that are associated with the tenant identity. The tenant authentication credentials can be used to authenticate the device management system 130 within the network infrastructure. FIG. 3 and associated descriptions provide additional details of the tenant identity and the tenant authentication credentials.

At 210, the administrator 104 of the device management system 130 configures a purchase account. In some implementations, the administrator 104 can configure the purchase account to associate with one or more licensing identities. At 215, the user 102 sends a request to manage licenses associated with a purchase account of a bulk licensing system. For example, the user 102 can request to install an application that is associated with a purchase account. In some cases, the request can include a tenant identity of the device management system 130.

At 220, the device management system 130 determines a licensing identity that is associated with the tenant identity. For example, the device management 130 can determine the licensing identity in accordance with the licensing identity received during the license identity registration procedure at 205. At 225, the device management system 130 sends a request for a license management operation to the bulk licensing system 180. The request for a license management operation includes the licensing identity. The license management operation is based on the request received at 215. For example, if the user 102 requests to install an application associated with a purchase account, the license management operation can include allocating a license in the purchase account to the user 102. In some cases, the device management system 130 can send the request by making a web service call to the bulk licensing system 180. In some cases, the request is authenticated using authentication credentials received at 205. FIG. 3 and associated descriptions provide additional details of the authentication procedures.

In some cases, the device management system 130 can determine whether the device management system 130 have access to the purchase account associated with the license management operation. For example, the device management system 130 can send a query to the bulk licensing system 180 for a list of the purchase accounts that are associated with the licensing identity. Upon receiving the list, the device management system 130 can render an administrative view of the purchase account. The administrative view may include a summary of the purchase account. The administrative view may also enable a purchase account to be selected for an administrative operation.

At 230, the bulk licensing system 180 determines whether to perform the license management operation based on the licensing identity. If the bulk licensing system 180 determines to perform the license management operation, at 235, the bulk licensing system 180 performs the license management operation. If the bulk licensing system 180 determines not to perform the license management operation, the bulk licensing system 180 refrains from performing the license management operation. In some cases, the bulk licensing system 180 can send an indication to the device management system 130 to indicate that the request for license management operation is rejected.

In some cases, the bulk licensing system 180 can identify the one or more licensing identities that are configured to associate with the purchase account at 210. For example, if the one or more licensing identities configured to associate with the purchase account include the licensing identity in the request for license management operation, the bulk licensing system 180 can determine to perform the requested license management operation. If the one or more licensing identities configured to associate with the purchase account does not include the licensing identity in the request for license management operation, the bulk licensing system 180 can determine not to perform the requested license management operation. In some implementations, the administrator 104 can configure one or more access rules for the one or more licensing identities associated with the purchase account. For example, the access rules can include allowing a licensing identity to perform some licensing management operations, but denying the licensing identity to perform other licensing management operations.

FIG. 3 is a flow chart illustrating an example process 300 of licensing identity registration procedures in license management operations. In some implementations, the licensing identity registration procedure can create a licensing identity that is associated with a tenant identity. In some cases, the licensing identity registration procedure can also generate authentication credentials associated with the licensing identity. The device management system can store the licensing identity and the authentication credentials use the licensing identity and the authentication credentials to request licensing management operations. In the illustrated example, the licensing identity registration procedure is performed by using an AAA challenge-response protocol.

As discussed previously, in some cases, a device management system can receive the tenant identity during an infrastructure registration procedure. In an infrastructure registration procedure, a network infrastructure manager may generate a tenant identity for the device management system. In some cases, the device management system can also receive tenant authentication credentials that are associated with the tenant identity during the infrastructure registration procedure. In some cases, the tenant identity can be an MDM Server Identity (MDM-SI). In some cases, the MDM-SI can be static. Once generated, this identity can represent the device management system within an enterprise application management environment. The following represents an example of the MDM-SI: 54947df8-0e9e-4471-a2f9-9af509fb5889.

At 305, the device management system 130 sends a registration request to the bulk licensing system 180. The registration request includes the tenant identity. In some cases, the registration request can also include the tenant authentication credentials associated with the tenant identity. At 310, the bulk licensing system 180 consults the authentication server 190 to authenticate the request. In some cases, the tenant authentication credentials are passed to the authentication server 190 to authenticate the device management system 130 that sends the request. At 315, the authentication server 190 sends an authentication response. At 320, the bulk licensing system 180 sends the registration response to the device management system 130. If the authentication is successful, the registration response can include a licensing identity for the device management system 130. In some cases, the registration response can also include authentication credentials that are associated with the licensing identity. In some cases, the authentication credentials can include a shared key.

In the enterprise application management environment, the shared key and MDM-SI can be passed within an Application Program Interface (API) request to the device management system once authenticated against AAA. For a third-party device management system, the shared secret may be transferred out of band instead of within an Application Program Interface (API).

The shared key is the secret that both the device management system and the bulk licensing system share. The following represents an example generation of the shared key:

javax.crypto.KeyGenerator.getInstance("Hmac-SHA512").generateKey( );

The shared key can be regenerated. For example, if the shared key is compromised, the device management system can receive the new shared key by performing another licensing identity registration procedure using the same tenant identity.

In some cases, as discussed below, the authentication credentials can be used to authenticate request for license management operation. For example, at 330, the device management system 130 sends a request for license management operation to the bulk licensing system 180. In some implementations, the shared key is used to authenticate the request. In some cases, the process for authenticating the request can be based on the RFC 2104 protocol. The requesting device management system can apply the message and the secret to an SHA-2 512 algorithm to generate a cryptographic hash. The message can be in xml or JSON post body. The bulk licensing system can look up the shared key and hash the JSON post body and compare. If the resulting hashes are equal, the requester is authorized.

In some cases, the Hypertext Transfer Protocol (HTTP) Authorization header can be based on the RFC 2617 protocol. The device management system can delimit the MDM-SI and the hash of the request with a colon, and base64 encode this delimited string. The following represents an example of the unencoded string:
    54947df8-0e9e-4471-a2f9-9af509fb5889:frfwfr023i4md-9kk9k3  d90k23kdjf894jf89ksdlkflajf94994k9k9d90d k340dkkekdf90jf The following represents an example of the encoded string:
    YW55IGNhcm5hbCBwbGVhcw The following represents an example of the Authorization header:
    Authorization: YW55IGNhcm5hbCBwbGVhcw The bulk licensing system 180 can decode the base64 encoded string and look up the shared key by splitting the authorization string getting the MDM-SI. Once the bulk licensing system 180 has the shared key, the bulk licensing system 180 can apply SHA-2 512 algorithm to compare the cryptographic hash.

In some implementations, RFC 2616 protocol can be used to provide the synchronization of clocks so that timestamps can be used to provide replay protection. The following is an example of the HTTP date header: Sun, 6 Nov. 1994 08:49:37 GMT. This date header can be used to calculate the epoch time to include in the requests.

To reduce complexity, when trying to match the hash included HTTP Authorization header with the hash generated using shared key of the MDM-SI specified in the same HTTP Authorization header and the HTTP Post body, the HTTP Post body can be reduced to a single line. For example, indents, such as new lines and carriage returns, can be removed. The following represents an example of the HTTP Post body:

```
<?xml version="1.0" encoding="UTF-8" ?>
<mdmrequest><user>someUser</user><timestamp>Tue, 06 May 2014
16:54:49 GMT</timestamp></mdmrequest>
```

At 335, the bulk licensing system 180 confirms time tolerance check. In some cases, replay attacks can occur when the valid signature of the request is not unique. This allows for the originator or a third party who intercepts the request to retransmit it. In some implementations, a request can be executed within a defined timeframe to prevent replay attack. For example, a request can include a timestamp in the JSON body. This timestamp can be a date based on the RFC 822 protocol and updated by the RFC 1123 protocol. To prevent the same replay of the request, the server can determine that the request happen within a period of time measured in milliseconds based on the HTTP Date provided. The tolerance value can be configurable to allow use to adjust easily if there are issues with large numbers of authorizations being returned. The default for the tolerance can be 1000 milliseconds. The following represents an example list of checks performed by the bulk licensing system 180 to confirm time tolerance:

1. get date now
2. get date timestamp in request body, if now date is present return 401
3. calculate the difference in milliseconds.
4. get the configurable tolerance
5. if the difference is less than or equal to tolerance continue.
6. if the difference is greater than tolerance return error.

If the request fails the time tolerance check, the bulk licensing system 180 can return a 401 Unauthorized message to the device management system 130. The following represents an example of timestamp in request:

```
JSON FORMAT
{...
"timestamp":"Sun, 06 Nov 1994 08:49:37 GMT"
...}
```

At 340, the bulk licensing system 180 performs an authentication check based on the shared key. As described previously, the authentication check includes a check on HTTP Authentication Header and Post Body. If the authentication fails, the bulk licensing system 180 can return an Unauthorized message to the device management system 130.

The following table represents example HTTP error codes for failures in authorization:

TABLE 1

| HTTP error codes | |
|---|---|
| HTTP Code | Cause |
| 401 | Cryptographic hash does not match one generated by server |
| 401 | Time outside tolerance |
| 403 | MDM Token ID does not exist |
| 403 | No authorization header |

Figure 4:
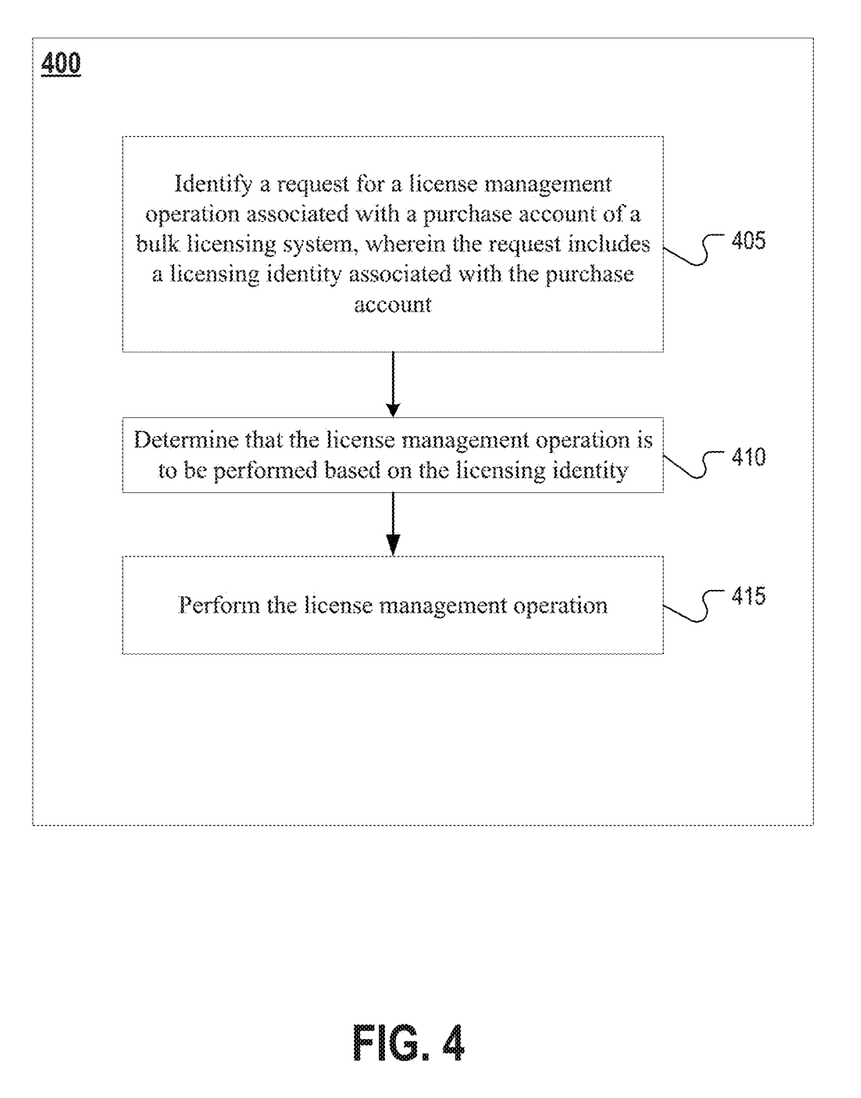
FIG. 4 is a flow chart illustrating an example method for managing access of device management systems in license management operations associated with purchase accounts of a bulk licensing system.

FIG. 4 is a flow chart illustrating an example method 400 for managing access of device management systems in license management operations associated with purchase accounts of a bulk licensing system.

At 405, a request for a license management operation associated with a purchase account of a bulk licensing system is identified. The request includes a licensing identity that is associated with the purchase account. In some cases, the request is generated by a device management system that is associated with the licensing identity included in the request. In some cases, a registration request is received from the device management system. In these or other cases, a registration response is sent to the device management system in response to the registration request. The registration response includes the licensing identity. In some cases, a configuration command associated with the purchase account; is received. In these or other cases, at least one licensing identity is configured to associate with the purchase account in response to the configuration command.

At 410, the license management operation is determined to be performed based on the licensing identity is determined. In some cases, the determination is made based on determining that the at least one configured licensing identity includes the licensing identity in the request.

At 415, the license management operation is performed. In some cases, the request is a first request, the license management operation is a first license management operation, and the licensing identity is the first licensing identity.

In these or other cases, a second request for a second license management operation associated with the purchase account of the bulk licensing system is identified. The second request includes a second licensing identity associated with the purchase account. The second licensing identity is different than the first licensing identity. In these or other cases, the second license management operation is determined not to be performed based on the second licensing identity, and performing the second license management operation is refrained.

Figure 5:
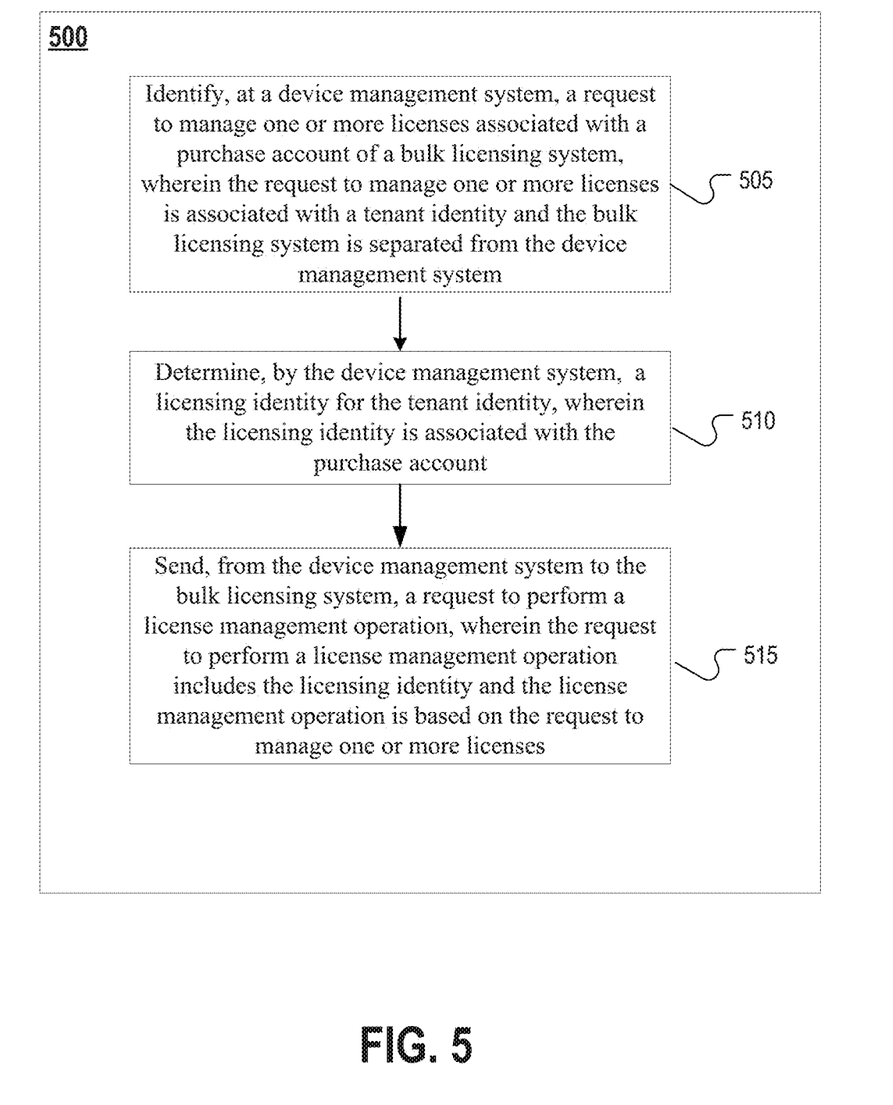
FIG. 5 is a flow chart illustrating another example method for managing access of device management systems in license management operations associated with purchase accounts of a bulk licensing system.

FIG. 5 is a flow chart illustrating another example method 500 for managing access of device management systems in license management operations associated with purchase accounts of a bulk licensing system.

At 505, a device management system identifies a request to manage one or more licenses associated with a purchase account of a bulk licensing system. The request to manage one or more licenses is associated with a tenant identity and the bulk licensing system is separated from the device management system. In some cases, a registration request is sent to the bulk licensing system. The registration request includes the tenant identity. A registration response is received in response to the registration request. The registration response includes the licensing identity. In some cases, the tenant identity is a Server Routing Protocol (SRP) Identifier (ID). In some cases, an authentication credential is received in response to the registration request. The authentication credential is associated with the licensing identity.

At 510, the device management system determines a licensing identity for the tenant identity. The licensing identity is associated with the purchase account.

At 515, a request to perform a license management operation is sent from the device management system to the bulk licensing system. The request to perform a license management operation includes the licensing identity. The license management operation is based on the request to manage one or more licenses. In some cases, the authentication credential is used in generating the request to perform the license management operation. In some cases, sending the request to perform a license management operation includes making a web service call to the bulk licensing system.

The preceding figures and accompanying description illustrate example processes and computer-implementable techniques. Environment 100 (or its software or other components) contemplates using, implementing, or executing any suitable technique for performing these and other tasks. These processes are for illustration purposes only, and the described or similar techniques may be performed at any appropriate time, including concurrently, individually, or in combination. In addition, many of the steps in these processes may take place simultaneously, concurrently, and/or in different order than as shown. Moreover, environment 100 may use processes with additional steps, fewer steps, and/or different steps, so long as the methods remain appropriate.

In other words, although this disclosure has been described in terms of certain implementations and generally associated methods, alterations and permutations of these implementations and methods will be apparent to those skilled in the art. Accordingly, the above description of example implementations does not define or constrain this disclosure. Other changes, substitutions, and alterations are also possible without departing from the spirit and scope of this disclosure.

What is claimed is:

1. A computer-implemented method executed by one or more processors, the method comprising:

receiving, at a bulk licensing system and from a device management system, a registration request, wherein the registration request includes a tenant identity identifying a server including the device management system, and the tenant identity is a Server Routing Protocol (SRP) Identifier (ID);

sending, in response to the registration request, a registration response to the device management system, wherein the registration response includes a licensing identity associated with the tenant identity;

receiving a request for a license management operation associated with a purchase account of a bulk licensing system, wherein the request includes the licensing identity, and the purchase account is associated with the licensing identity;

in response to the receiving, determining that the license management operation is to be performed based on the licensing identity; and in response to the determining, performing the license management operation.

2. The method of claim 1, wherein the request is a first request, the license management operation is a first license management operation, and the licensing identity is the first licensing identity, further comprising:

identifying a second request for a second license management operation associated with the purchase account of the bulk licensing system, wherein the second request includes a second licensing identity associated with the purchase account, wherein the second licensing identity is different than the first licensing identity;

in response to the identifying, determining that the second license management operation is not to be performed based on the second licensing identity; and in response to the determining, refraining from performing the second license management operation.

3. The method of claim 1, further comprising:

receiving a configuration command associated with the purchase account; and configuring, in response to the configuration command, at least one licensing identity to associate with the purchase account.

4. The method of claim 3, wherein the determination that the license management operation is to be performed comprises determining that the at least one configured licensing identity includes the licensing identity in the request.

5. The method of claim 1, wherein the licensing identity is associated with the purchasing account of the bulk licensing system.

6. The method of claim 1, wherein the registration request includes a tenant authentication credential, further comprising:

performing an authentication procedure using the tenant authentication credential; and sending, to the device management system, an authentication credential associated with the licensing identity.

7. A computer-implemented method executed by one or more processors, the method comprising:

sending, at a device management system, a registration request to a bulk licensing system, wherein the registration request includes a tenant identity identifying a server including the device management system, and the tenant identity is a Server Routing Protocol (SRP) Identifier (ID);

receiving, in response to the registration request, a registration response, wherein the registration response includes a licensing identity associated with the tenant identity;

identifying, at the device management system, a request to manage one or more licenses associated with a purchase account of the bulk licensing system, wherein the request to manage one or more licenses is associated with the tenant identity and the bulk licensing system is separated from the device management system;

determining, by the device management system, that the licensing identity is associated with the tenant identity; and sending, from the device management system to the bulk licensing system, a request to perform a license management operation, wherein the request to perform a license management operation includes the licensing identity and the license management operation is based on the request to manage one or more licenses.

8. The method of claim 7, further comprising:
receiving, in response to the registration request, an authentication credential, wherein the authentication credential is used in generating the request to perform the license management operation.

9. The method of claim 7, wherein sending the request to perform a license management operation comprises making a web service call to the bulk licensing system.

10. A non-transitory, computer-readable medium storing instructions operable when executed to cause at least one processor to perform operations comprising:
receiving a registration request from a device management system, wherein the registration request includes a tenant identity identifying a server including the device management system, and the tenant identity is a Server Routing Protocol (SRP) Identifier (ID);

sending, in response to the registration request, a registration response to the device management system, wherein the registration response includes a licensing identity associated with the tenant identity;

receiving a request for a license management operation associated with a purchase account of a bulk licensing system, wherein the request includes the licensing identity, and the purchase account is associated with the licensing identity;

in response to the receiving, determining that the license management operation is to be performed based on the licensing identity; and in response to the determining, performing the license management operation.

11. The computer-readable medium of claim 10, wherein the request is a first request, the license management operation is a first license management operation, and the licensing identity is the first licensing identity, the operations further comprising:
identifying a second request for a second license management operation associated with the purchase account of the bulk licensing system, wherein the second request includes a second licensing identity associated with the purchase account, wherein the second licensing identity is different than the first licensing identity;

in response to the identifying, determining that the second license management operation is not to be performed based on the second licensing identity; and in response to the determining, refraining from performing the second license management operation.

12. The computer-readable medium of claim 10, the operations further comprising:
receiving a configuration command associated with the purchase account; and
configuring, in response to the configuration command, at least one licensing identity to associate with the purchase account.

13. The computer-readable medium of claim 12, wherein the determination that the license management operation is to be performed comprises determining that the at least one configured licensing identity includes the licensing identity in the request.

14. The computer-readable medium of claim 10, wherein the licensing identity is associated with the purchasing account of the bulk licensing system.

15. The computer-readable medium of claim 10, wherein the registration request includes a tenant authentication credential, the operation further comprising:
performing an authentication procedure using the tenant authentication credential; and
sending, to the device management system, an authentication credential associated with the licensing identity.

16. A system comprising:
memory for storing data; and
one or more processors operable to perform operations comprising:
receiving a registration request from a device management system, wherein the registration request includes a tenant identity identifying a server including the device management system, and the tenant identity is a Server Routing Protocol (SRP) Identifier (ID);

sending, in response to the registration request, a registration response to the device management system, wherein the registration response includes a licensing identity associated with the tenant identity;

receiving a request for a license management operation associated with a purchase account of a bulk licensing system, wherein the request includes the licensing identity, and the purchase account is associated with the licensing identity;

in response to the receiving, determining that the license management operation is to be performed based on the licensing identity; and in response to the determining, performing the license management operation.

17. The system of claim 16, wherein the request is a first request, the license management operation is a first license management operation, the licensing identity is the first licensing identity, and the operations further comprise:
identifying a second request for a second license management operation associated with the purchase account of the bulk licensing system, wherein the second request includes a second licensing identity associated with the purchase account, wherein the second licensing identity is different than the first licensing identity;

in response to the identifying, determining that the second license management operation is not to be performed based on the second licensing identity; and in response to the determining, refraining from performing the second license management operation.

18. The system of claim 16, wherein the licensing identity is associated with the purchasing account of the bulk licensing system.

* * * * *